(No Model.) 2 Sheets—Sheet 2.
C. J. EAMES.
PROCESS OF AND APPARATUS FOR THE REDUCTION OF ORE.
No. 455,458. Patented July 7, 1891.
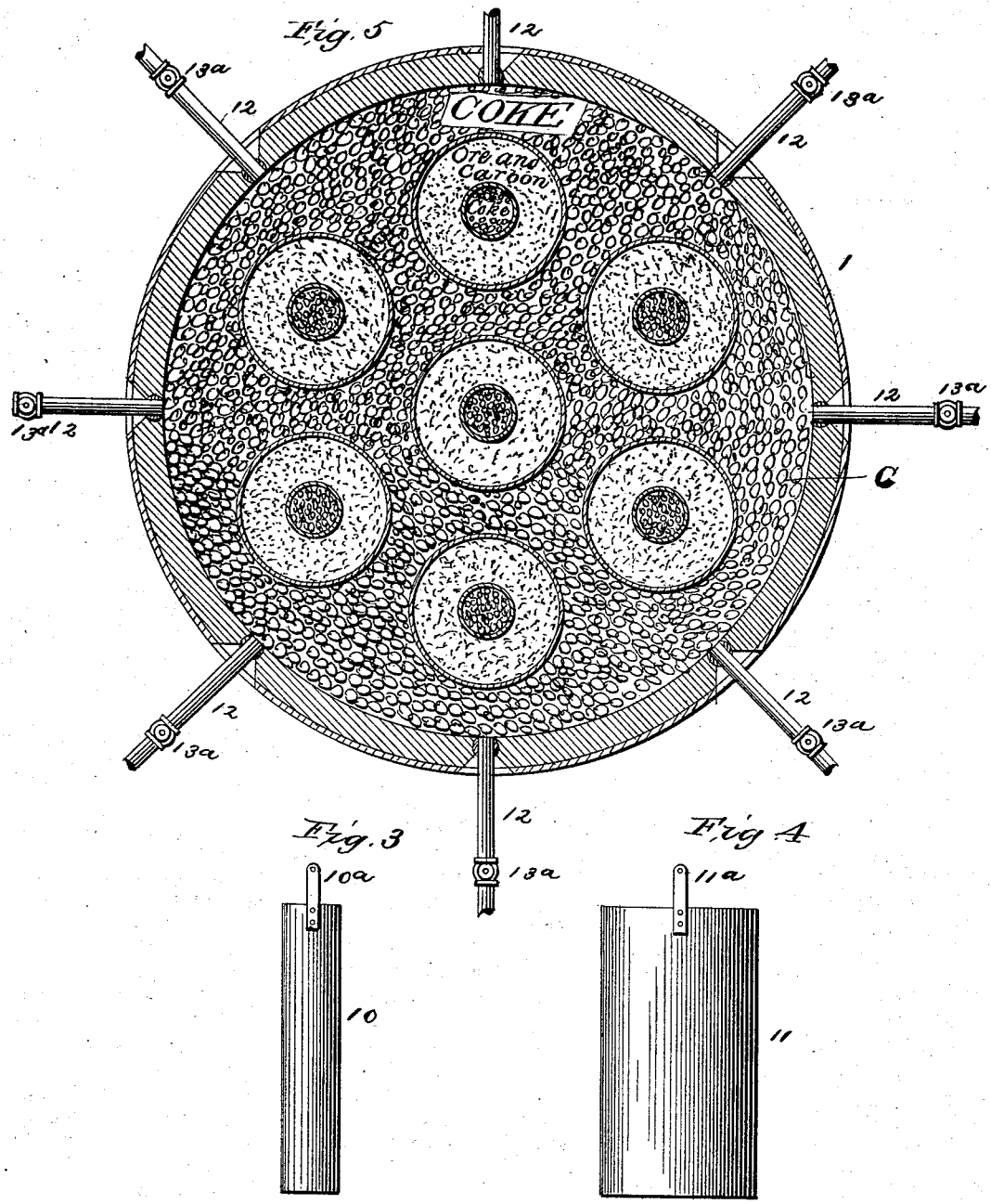

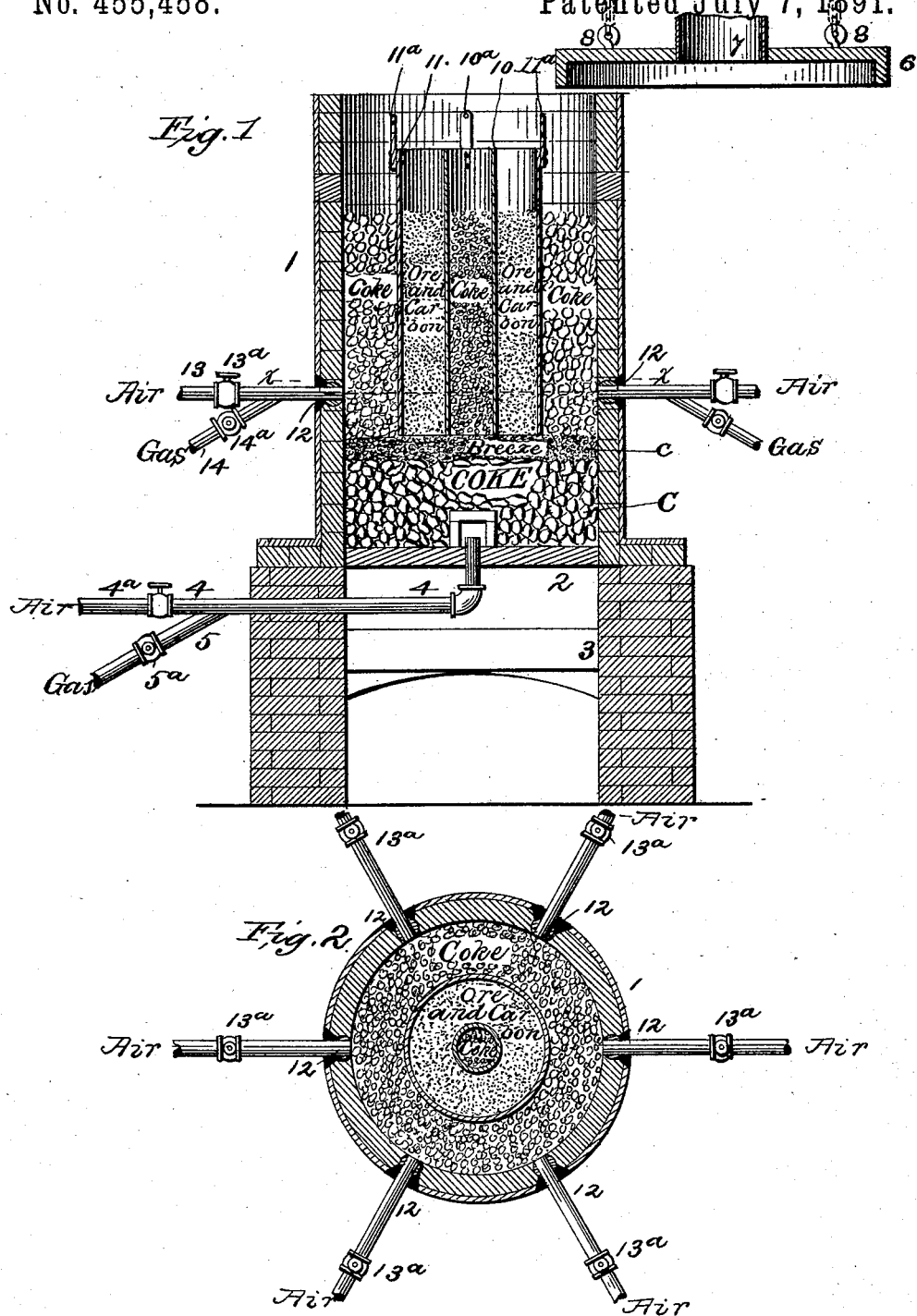

United States Patent Office.

CHARLES J. EAMES, OF NEW YORK, N. Y.

PROCESS OF AND APRARATUS FOR THE REDUCTION OF ORE.

SPECIFICATION forming part of Letters Patent No. 455,458, dated July 7, 1891.

Application filed November 28, 1890. Serial No. 372,902. (No model.)

*To all whom it may concern:*

Be it known that I, CHARLES J. EAMES, a citizen of the United States, residing at New York city, in the State of New York, have invented certain new and useful Improvements in Processes of and Apparatus for the Reduction of Ore; and I hereby declare the following to be a full, clear, and exact description of the same, reference being had to the accompanying drawings, wherein—

Figure 1 is a vertical central section of a reducing-furnace adapted for use in carrying out my process and illustrating the preferred method of charging. Fig. 2 is a horizontal section of the furnace, charge, &c., on the lines *x x*, Fig. 1. Figs. 3 and 4 are detached views of the templets used in charging the furnace; and Fig. 5 is a horizontal section of a furnace adapted for carrying out the process on a larger scale, illustrating the arrangement of a series of ore-columns for treatment in a single furnace.

Like symbols refer to like parts wherever they occur.

Heretofore in the reduction of ores by subjecting a series of alternate and superimposed layers or stratas of granulated ore mixed with carbon and layers of broken carbon in a reducing-furnace or closed chamber to the action of heated currents of a reducing-gas—such as carbonic oxide from the combustion of gas, natural gas, or the carbon of the bed-layer—difficulty has been experienced and considerable delay has resulted from the compacting of the superimposed layers and the agglutination of the ore under excessive heat, all of which impeded the passage of the reducing-gas, so that the process often required four or five hours for completion.

The object of the present invention is to insure the permeability of the charge, and thus to obviate the loss of time and unequal working of the furnace, due in part to the above-recited causes, and also to expedite the final operation or agglutination of the mass for removal from the furnace.

To this end the main feature of the present invention consists in subjecting a series of vertical walls or columns of mixed ore and granulated carbon and interposed fillings or packings of broken carbon to currents of heated reducing-gases, the interposed packing of broken carbonaceous matter serving at all times to preserve the porosity of the charge and insure the uninterrupted and equal flow of the reducing-gas throughout the furnace or closed chamber containing the charge. Though the charge may be arranged like vertical walls, yet the preferred form of the charge is that of cylindrical columns having a core or center of granulated carbon and surrounded by a packing of the same, the whole arranged upon a bed of coke or its equivalent, and for the purpose of erecting such columns within the furnace and for withdrawing the ore after reduction special means have been provided, which apparatus or means forms a subsidiary part of the present invention, as will hereinafter more fully appear.

I will now proceed to describe my invention more fully, so that others skilled in the art to which it appertains may apply the same.

Within a suitable furnace or closed chamber I prepare a bed or bottom layer of lump coke or broken carbon some twelve (12) or eighteen (18) inches in thickness, and in order to properly heat the furnace, as well as to assist in the generation of reducing-gas for the subsequent process I bring the said bed layer of carbon to a state of incandescence by means of an air-blast alone or by a mixture of air and gas, or, if convenient, by means of natural gas and a suitable air-blast. When the chamber has been raised to the requisite temperature, I cut off the air and gas, and upon the incandescent bed or bottom layer charge a layer of about six (6) inches of finely-broken coke or other carbon. This will temporarily reduce the temperature and in a measure protect the operator while charging the furnace. Upon the foundation thus formed and by means of suitable temporary partitions I erect vertical walls or columns of mixed granulated ore and carbon, said walls some six (6) inches (more or less) in thickness, and then fill the intervening spaces with broken carbon, so that there shall be alternate masses of reducing agent and broken ore mixed with the reducing agent, after which the temporary partitions are withdrawn, the furnace is closed, and a limited air-blast or a blast of mixed air and gas or natural gas is admitted to the incandescent bed-layer to supply the necessary reducing-gas and maintain the requisite temperature. When this process has been continued for from one to two hours the ore will be found to be uniformly reduced or deoxidized throughout the charge, whereupon the temperature can be rapidly raised to agglutinate the metallic particles and the charge withdrawn and subjected to the squeezers or otherwise manipulated, as desired.

In the drawings illustrating suitable apparatus for practising the above-described process, 1 indicates a stack of any desired diameter according to the number of columns desired in the charge and of comparatively little height, because the best results will be obtained by limiting the height of the columns to about two feet.

2 indicates the bottom of the stack supported on a suitable arch 3, which bottom may or may not be a drop-bottom, (such as shown in my patents, Nos. 404,181 and 404,182, dated May 28, 1889,) depending upon whether it is preferred to lift the charge from the furnace or discharge it below the same. In some instances side doors may be provided for withdrawing the sponge. Delivering into the bottom of the furnace is an induction-pipe 4, which may serve as an air-blast and be provided with a gas-supply pipe 5, delivering thereinto, both pipes 4 and 5 being provided with suitable valves $4^a$ $5^a$, or other means of controlling and limiting the entrance of air or gas into the furnace.

The charge will preferably be introduced through the top of the furnace, and, if desired, may be so withdrawn, and for said purpose or purposes I form the furnace with a removable cover or crown 6, having an exit-pipe 7 (controlled by a damper) for the escape of gases, and with eyes 8 8 or equivalent means for applying a crane to remove the said crown or cover 6 in charging or drawing the charge.

10 indicates a core-templet, and 11 an outer templet, for forming cylindrical charges, the former of which is preferably about six (6) inches in diameter and the latter about eighteen (18) inches in diameter, so as to form a cylindrical column of mixed ore and reducing agent with walls of, say, six (6) inches (more or less) in thickness.

$10^a$ and $11^a$ indicate eyes on the upper ends of the templets 10 and 11, through which a bar may be placed or to which the crane may be attached for the purpose of withdrawing said templets from the charge before closing the furnace.

12 12 indicate a series of movable or adjustable tuyeres projecting through the walls of the stack on a line just above the top of the bottom or bed layer of the charge, which tuyeres may be formed by combining air-blast pipe 13 and gas-supply pipe 14, each of which has a suitable valve $13^a$ $14^a$, so that either air or gas, or both, can be used either to re-enforce the reducing-gas during the reduction process or to augment the heat to cause the agglutination of the metal when the reduction process is completed and before withdrawing the charge. These tuyeres may have spherical projections at their inner ends, said projections arranged in corresponding seats in the walls of the furnace, so as to form a movable bearing for the end of the tuyere, and the said tuyere-pipes 13 and 14 may have flexible tubular connections with the gas and air supply. The object of making these tuyeres movable is that the agglutinating blast of air may be directed up and down the column in the final stage or stages of agglutination of the metal.

In carrying out the hereinbefore-recited process a layer C, some eighteen inches thick, of broken coke or lump carbon is first placed on the bottom 2 of the furnace and ignited. The crown or cover 6 is replaced and an air-blast is introduced through pipe 4, or air and gas through pipes 4 and 5, until the bed layer C is incandescent and the furnace properly heated, the waste gases escaping from the chamber through pipe 7. The air and gas are then cut off, the crown or cover 6 is removed from the furnace, and a top dressing or layer c, some six (6) inches thick, of fine carbon or breeze is spread over the incandescent bed layer C to dampen the same and form a foundation for the columns of mixed granulated ore and carbon which form the charge. One set or any number of sets of templets 10 and 11, according to the capacity of the furnace, are then arranged on the bed C c, as indicated in the drawings, and the space R between the templets 10 11 is filled with a mixture of granulated or finely-broken ore and carbon or other reducing agent. The interior of the templets 10 is filled with broken coke, and the space in the furnace exterior to the templet 11 is filled with broken coke, after which the templets 10 and 11 are withdrawn, leaving on the bed C c one or more hollow vertical cylinders of mixed ore and reducing agent, each having a core of broken coke and surrounded by a packing of broken coke. The crown or cover 6 is then replaced, the air-blast or blast of air and gas is turned on until the required temperature and quality of reducing-gas is obtained, and the operation maintained for one to two hours, by which time the reduction of the ore will be completed. As soon as reduction is complete an additional supply of air is introduced into the furnace through the movable tuyeres 12 12 above the bed C c, as well as through the bottom, and directed against the carbon surrounding columns of reduced ore, and up through the cores to raise the temperature of the furnace and cause the rapid agglutination of the particles of metal, after which the charge may be removed from the reduction-furnace and manipulated in any of the several ways well understood in the art.

While the process is capable of being carried on by generating the reducing-gas from the carbon within the furnace, yet it will be evident to persons skilled in the art that where gas or natural gas is available it should be used, as the reducing-gas is thus supplied in the reducing process to the saving or preservation of the carbon of the charge, and the carbon of the charge is thus left intact until the agglutinating stage is reached, when it can be consumed by the air-blast alone to rapidly raise the heat to the agglutinating-point, and thus greatly expedite the final steps of the process.

Having thus described my invention, what I claim, and desire to secure by Letters Patent, is—

1. The method herein described for reducing ores, which consists in inclosing vertical columns composed of a mixture of granulated ore and reducing agent with surrounding packings of broken coke or equivalent carbonaceous matter, said column being supported by a bed layer of incandescent carbon, and subjecting the same to currents of a highly-heated reducing-gas, substantially as and for the purposes specified.

2. The method herein described for reducing ores, which consists in subjecting a cylindrical column of granulated ore and reducing agent having a core and envelope of broken coke or like carbonaceous matter, said column being supported by a bed layer of incandescent carbon, to currents of a highly-heated reducing-gas, substantially as and for the purposes described.

3. The method herein described for charging ore-reducing furnaces, which consists in, first, forming a bed layer of incandescent broken coke or like carbonaceous matter; second, applying a layer of fine coke or breeze thereon, and, third, erecting a series of vertical columns of granulated ore and reducing agent and interposed walls or packings of broken coke or like carbonaceous matter upon the incandescent bed layer, substantially as and for the purposes specified.

4. The method herein described for reducing ores, which consists in subjecting a column of granulated ore and reducing agent which is enveloped by broken coke or like carbonaceous matter and supported by a bed layer of incandescent carbon to currents of highly-heated reducing-gas until the reduction of the ore is effected, and finally increasing the air-supply to the carbon envelope of the column, so as to burn said envelope to cause the rapid increase of temperature and agglutination of the metal particles, substantially as and for the purposes specified.

In testimony whereof I affix my signature, in presence of two witnesses, this 26th day of November, 1890.

CHARLES J. EAMES.

Witnesses:
F. W. RITTER, Jr.,
F. R. CORNWALL.